(12) United States Patent
Hashimoto

(10) Patent No.: US 7,964,299 B2
(45) Date of Patent: Jun. 21, 2011

(54) METHOD OF RECYCLING A BATTERY

(75) Inventor: Zenzo Hashimoto, Kawasaki (JP)

(73) Assignee: EnerDel, Inc., Indiapolis, IN (US)

( * ) Notice: Subject to any disclaimer, the term of this patent is extended or adjusted under 35 U.S.C. 154(b) by 637 days.

(21) Appl. No.: 11/550,639

(22) Filed: Oct. 18, 2006

(65) Prior Publication Data
US 2007/0134546 A1 Jun. 14, 2007

Related U.S. Application Data

(60) Provisional application No. 60/727,779, filed on Oct. 18, 2005.

(51) Int. Cl.
H01M 6/50 (2006.01)
(52) U.S. Cl. ............... 429/49; 429/50; 29/426.1
(58) Field of Classification Search .......... 429/49, 429/426.1, 50; 29/763, 426.1
See application file for complete search history.

(56) References Cited

U.S. PATENT DOCUMENTS

| 6,573,685 | B2 | 6/2003 | Nakanishi et al. | |
| 2001/0008723 | A1* | 7/2001 | Kawakami et al. | 429/49 |
| 2004/0113588 | A1 | 6/2004 | Mikuriya et al. | |
| 2005/0208368 | A1* | 9/2005 | Nakamura et al. | 429/49 |
| 2005/0212488 | A1 | 9/2005 | MacNair, Jr. et al. | |

OTHER PUBLICATIONS

"Duracell intorduces first on battery tester", PR newsire. 1996. Accessed Feb. 19, 2010. <http://www.prnewswire.co.uk/cgi/news/release?id=13863>.*

* cited by examiner

Primary Examiner — Stuart Hendrickson
Assistant Examiner — Richard M Rump
(74) Attorney, Agent, or Firm — Ice Miller LLP

(57) ABSTRACT

A method of the present invention is directed to recycling a battery that includes a plurality of lithium cells removable from one another. The battery is tested to measure internal resistance of the lithium cells to determine if the lithium cells present a predetermined level of operational capability. The lithium cells having the operational level less than the predetermined level of operational capability are replaced with new lithium cells as the battery is re-assembled. The removed lithium cells are recycled.

22 Claims, 7 Drawing Sheets

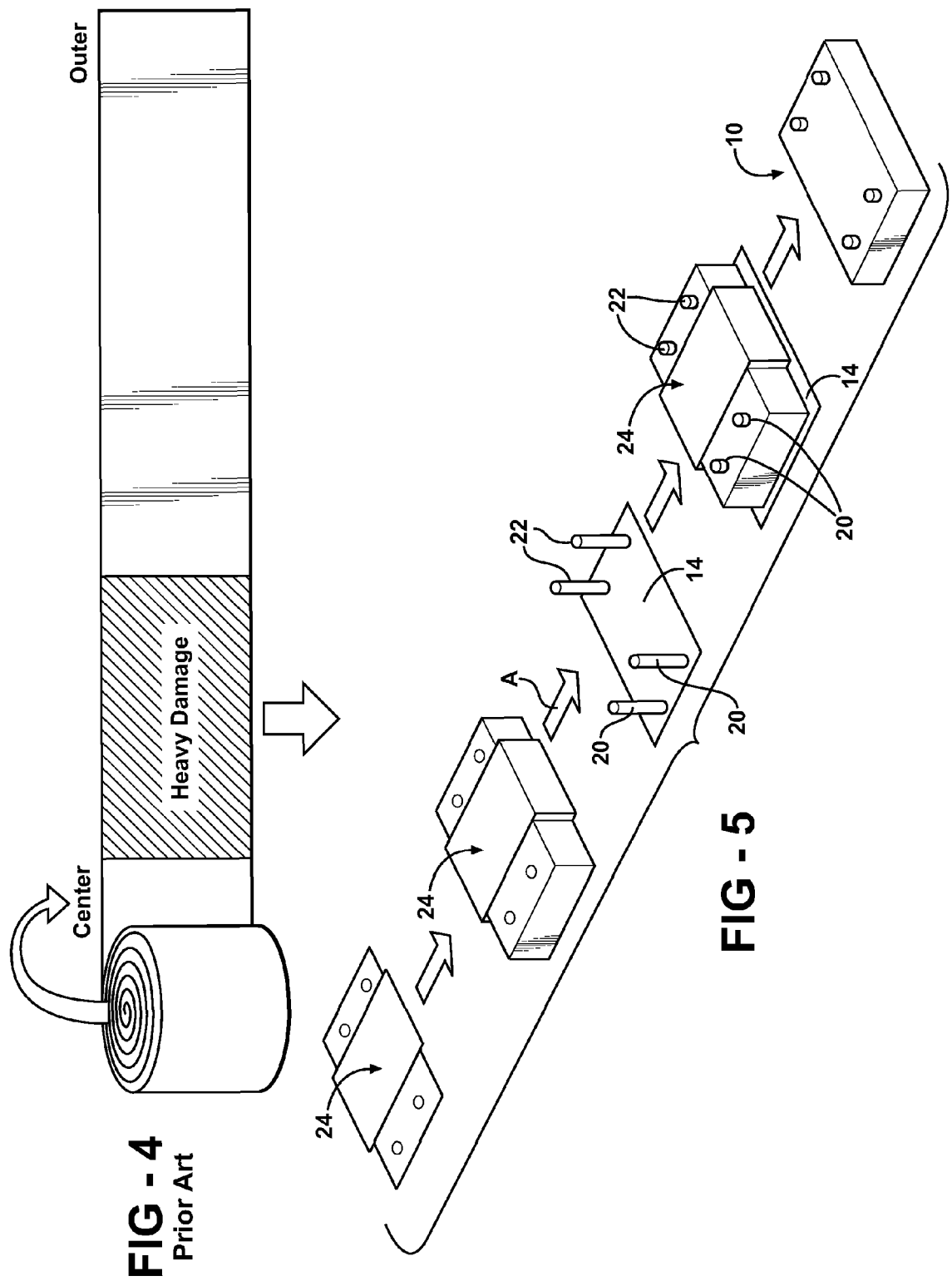

METHOD OF RECYCLING A BATTERY

RELATED APPLICATIONS

This application claims priority to U.S. Provisional Patent Application Ser. No. 60/727,779 filed Oct. 18, 2005, which is hereby incorporated by reference.

FIELD OF THE INVENTION

The subject invention relates to battery packs having multiple cells, and more particularly to a method of recycling the cell of the battery pack.

BACKGROUND OF THE INVENTION

Motor vehicles, such as, for example, hybrid vehicles use multiple propulsion systems to provide motive power. This hybrid vehicles recharge their batteries by capturing kinetic energy via regenerative braking. When cruising or idling, some of the output of the combustion engine is fed to a generator (merely the electric motor(s) running in generator mode), which produces electricity to charge the batteries. This contrasts with all-electric cars which use batteries charged by an external source such as the grid, or a range extending trailer. Nearly all hybrid vehicles still require gasoline as their sole fuel source though diesel and other fuels such as ethanol or plant based oils have also seen occasional use.

Battery is an important energy storage device and is well known in the art. The battery converts chemical energy within its material constituents into electrical energy in the process of discharging. A rechargeable battery is generally returned to its original charged state by passing an electrical current in the opposite direction to that of the discharge. Presently, well known rechargeable battery technologies include Lithium Ion (LiON), Nickel Cadmium (NiCd), and Nickel Metal Hydride (NiMH). Each battery includes multiple cells that typically comprise electrodes and an ion conducting electrolyte therebetween. For example, the rechargeable lithium ion cell, known as a rocking chair type lithium ion battery, typically comprises essentially two electrodes, an anode and a cathode, and a non-aqueous lithium ion conducting electrolyte therebetween. The anode (negative electrode) is a carbonaceous electrode that is capable of intercalating lithium ions. The cathode (positive electrode), a lithium retentive electrode, is also capable of intercalating lithium ions. The carbon anode comprises any of the various types of carbon (e.g., graphite, coke, carbon fiber, etc.) which are capable of reversibly storing lithium species, and which are bonded to an electrochemically conductive current collector (e.g., copper foil) by means of a suitable organic binder (e.g., polyvinylidine fluoride, PVdF). The cathode comprises such materials as transition metals and chalcogenides that are bonded to an electrochemically conducted current collector (e.g., aluminum foil) by a suitable organic binder. Chalcogenide compounds include oxides, sulfides, selenides, and tellurides of such metals as vanadium, titanium, chromium, copper, molybdenum, niobium, iron, nickel, cobalt, and manganese. Lithiated transition metal oxides are, at present, the preferred positive electrode intercalation compounds. Examples of suitable cathode materials include $LiMnO_2$, $LiCoO_2$, $LiNiO_2$, and $LiFePO_4$, their solid solutions and/or their combination with other metal oxides and dopant elements, e.g., titanium, magnesium, aluminum, boron, etc.

The electrolyte in such lithium ion cells comprises a lithium salt dissolved in a non-aqueous solvent which may be (1) completely liquid, (2) an immobilized liquid (e.g., gelled or entrapped in a polymer matrix), or (3) a pure polymer. Known polymer matrices for entrapping the electrolyte include polyacrylates, polyurethanes, polydialkylsiloxanes, polymethacrylates, polyphosphazenes, polyethers, polyvinylidine fluorides, polyolefins such as polypropylene and polyethylene, and polycarbonates, and may be polymerized in situ in the presence of the electrolyte to trap the electrolyte therein as the polymerization occurs. Known polymers for pure polymer electrolyte systems include polyethylene oxide (PEO), polymethylene-polyethylene oxide (MPEO), or polyphosphazenes (PPE). Known lithium salts for this purpose include, for example, $LiPF_6$, $LiClO_4$, $LiSCN$, $LiAlCl_4$, $LiBF_4$, $LiN(CF_3SO_2)_2$, $LiCF_3SO_3$, $LiC(SO_2CF_3)_3$, $LiO_3SCF_2CF_3$, $LiC_6F_5SO_3$, $LiCF_3CO_2$, $LiAsF_6$, and $LiSbF_6$. Known organic solvents for the lithium salts include, for example, alkyl carbonates (e.g., propylene carbonate and ethylene carbonate), dialkyl carbonates, cyclic ethers, cyclic esters, glymes, lactones, formates, esters, sulfones, nitrates, and oxazoladinones. The electrolyte is incorporated into pores in a separator layer between the anode and the cathode. The separator layer may be either a microporous polyolefin membrane or a polymeric material containing a suitable ceramic or ceramic/polymer material.

Today, one of major problems that manufactures of the lithium batteries are trying to solve relates protection of the global environment. As a result, the collection of various used batteries has become more and more active. Further, local governments have legislated the recycling of batteries so that the collection and reuse of used batteries is being promoted. However, the collection and reuse of used batteries requires a large effort and cost, and as a result most used batteries are abandoned without collection or reuse. To address this problem, the use of rechargeable batteries which may be charged over and over has been promoted; using such rechargeable batteries is thus advantageous for the protection of the global environment. Nevertheless, there are drawbacks that rechargeable batteries are costly, a rechargeable battery needs a charger for recharging, a long time is often required for recharging, etc. As a result, many users choose not to use rechargeable batteries. Prior batteries formed of multiple cells have been constructed as a single unit so that if even a single cell becomes defective, the entire battery must be discarded and recycled. An example is the cylinder cell in the form of a coiled flat cell. These prior batteries also can become excessively hot during use.

Various prior art references tried to solve one or more problems associated with the aforementioned drawbacks. The United States Patent Publication No. 20040113588 to Mikuriya et al. teaches a method of recycling secondary batteries by establishing several sites or locations for receiving used secondary batteries (i.e., discharged secondary batteries) from users of the secondary batteries and handing over to the users the secondary batteries that have been processed for revitalization such as recharging. The first site conducts a predetermined inspection to classify batteries into at least two groups of different levels, those in one group that can be handed over to the user as they are, and the others in another group that need to be forwarded to the second site. The second site, which receives the secondary batteries transferred from first site, conducts another inspection to classify the batteries into another two groups of different levels, with the secondary batteries of one level being returned to the first site and with the other batteries being transferred to the third site wherein the batteries are subject to a recycling process. The method taught by the United States Patent Publication No. 200401133588 to Mikuriya et al. requires multiple redundant operations and several sites for determining levels of the batteries. Moreover, this method is still leaves the batteries which are not reusable.

Alluding to the above, there is a constant need in the area of the battery art for an improved method and system for recovering and recycling battery cells that will eliminate one or more of the aforementioned problems.

SUMMARY OF THE INVENTION

A battery assembly or pack of the present invention is adaptable to be utilized in various configurations including and not limited to an overlapping battery cell packaging configuration and a vertical stack battery cell packaging configuration. The battery pack includes a housing to hold a plurality of cells. The housing includes a plurality of pins extending from the bottom of the housing and through a lid of the housing. Each cell is further defined by an envelope of a rectangular configuration having a negative terminal and a positive terminal opposed the negative terminal and spaced by side edges. Each positive and negative terminal defines at least one opening extending therein. Each cell includes a plurality of electrodes of opposite charges disposed therein for conducting electrolyte therebetween. Preferably, these plurality of electrodes are further defined by a first electrode adjacent a first current collector and a second electrode of charge opposite from the first electrode and adjacent a second current collector and a separator layer positioned between the first and second electrodes. The cells are removably connected with one another by the pins extending through the openings defined in the terminals and further extending beyond the housing of the battery pack. The cells are tested to determine charge and discharge capacity. Any damaged cells are replaced with new cells. The damaged unit cell or cells are recycled after a charge capacity or a discharge capacity of the cell is determined by measuring the internal resistance of the damaged cell thereby categorizing or grouping the cell into multiple grades. The most damaged cells undergo the recycling process.

An advantage of the present invention is to provide an improved system for recycling battery cells.

Another advantage of the present invention is to provide to be utilized at a low cost, and which allows efficient monitoring of such a plurality of novel battery recharging apparatuses.

Still another advantage of the present invention is to provide a system, which allows to increase or decrease power density of the battery by adding cells or reducing the cells.

Still another advantage of the present invention is to provide a method of removing, testing and recycling the cells in which the cells are refurbished rather than replaced.

Still another advantage of the present invention is to provide a method of recycling lithium battery cells that is cost effective, environmentally safe, and efficient.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 illustrates prior art battery design with damaged electrode;

FIG. 5 illustrates an assembly patter of the battery pack of FIG. 1;

DETAILED DESCRIPTION OF THE PREFERRED EMBODIMENT

Figure 1:
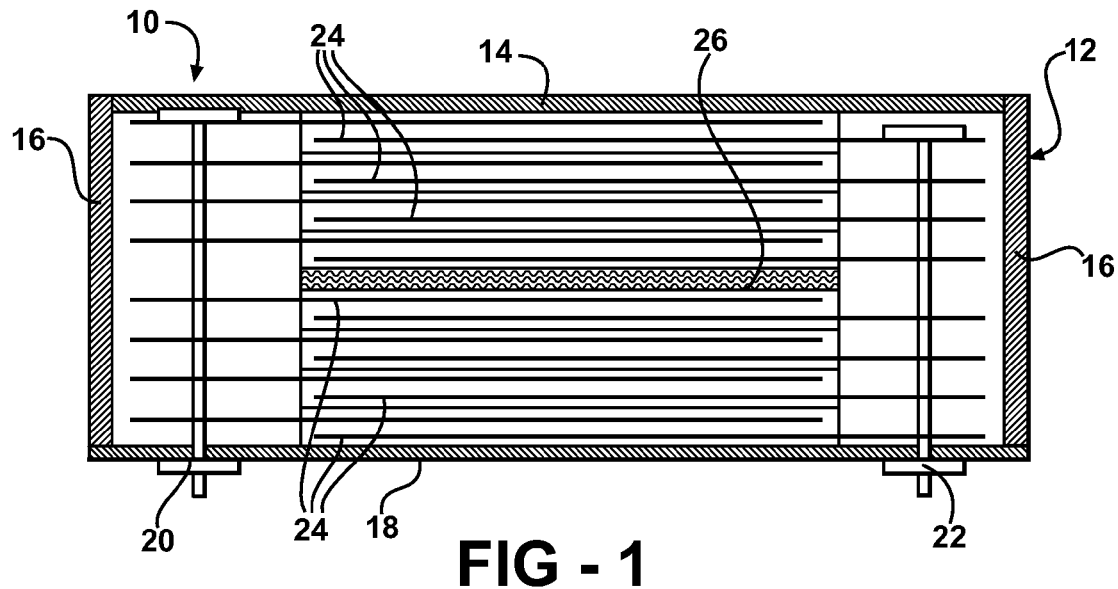
FIG. 1 is a cross sectional view of a battery pack of the present invention.

Referring to the Figures, wherein like numerals indicate like or corresponding parts, a battery pack of the present invention is generally shown at 10 in FIG. 1. The battery pack 10 of the present invention is adaptable to be utilized in various configurations including and not limited to an overlapping battery cell packaging configuration, a vertical stack battery cell packaging configuration, and other configurations without limiting the scope of the present invention.

The battery pack 10 includes a housing 12 having a bottom 14 and side walls 16 and a lid 18 removably attached to the walls 16. A plurality of pressing members or pins 20 and 22 extend from the bottom 14 and through the lid 18 for compressing a plurality of lithium cells 24 (the cells 24) disposed therein. Preferably, each cell 24 is a bi-cell, as known to those skilled in a battery art. The structure of the cell 24 will be discussed in details as the description of the present invention proceeds further below. A resilient member 26 is disposed between the cells 24 to apply external pressure to the cells 24 thereby forcing the same against the lid 20 and the bottom 14 of the housing 12. The mechanical connection defined between the walls 16 and the lid 18 of the housing 12 allows a technician (not shown) to test the cells 24, as the lid 20 is removed from the housing 12 and the cells 24 are removed to measure the internal resistance of the cells 24 to determine at a charge capacity and a discharge capacity in order to further determine if the cells 24 present a predetermined level of operational capability.

Figure 2:
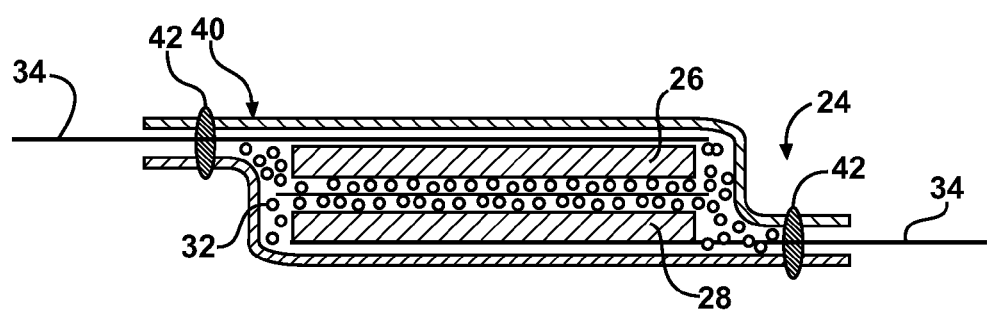
FIG. 2 is a cross sectional view of a lithium cell.
Figure 3:
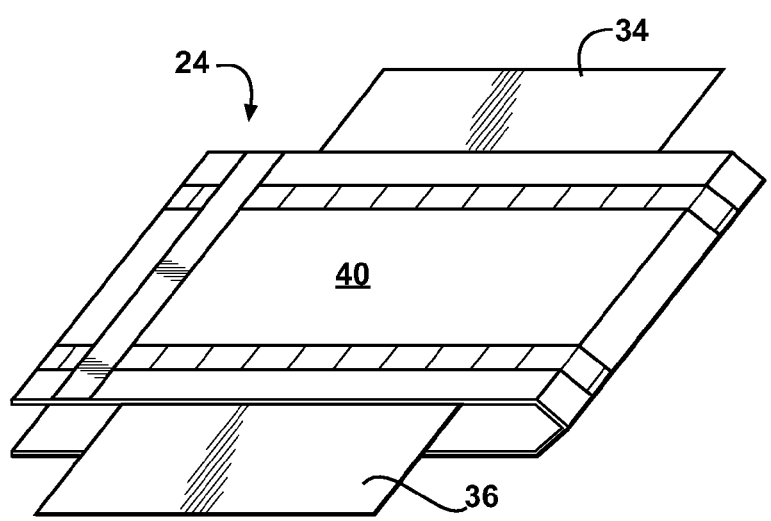
FIG. 3 is perspective view of the lithium cell.
Figure 6:
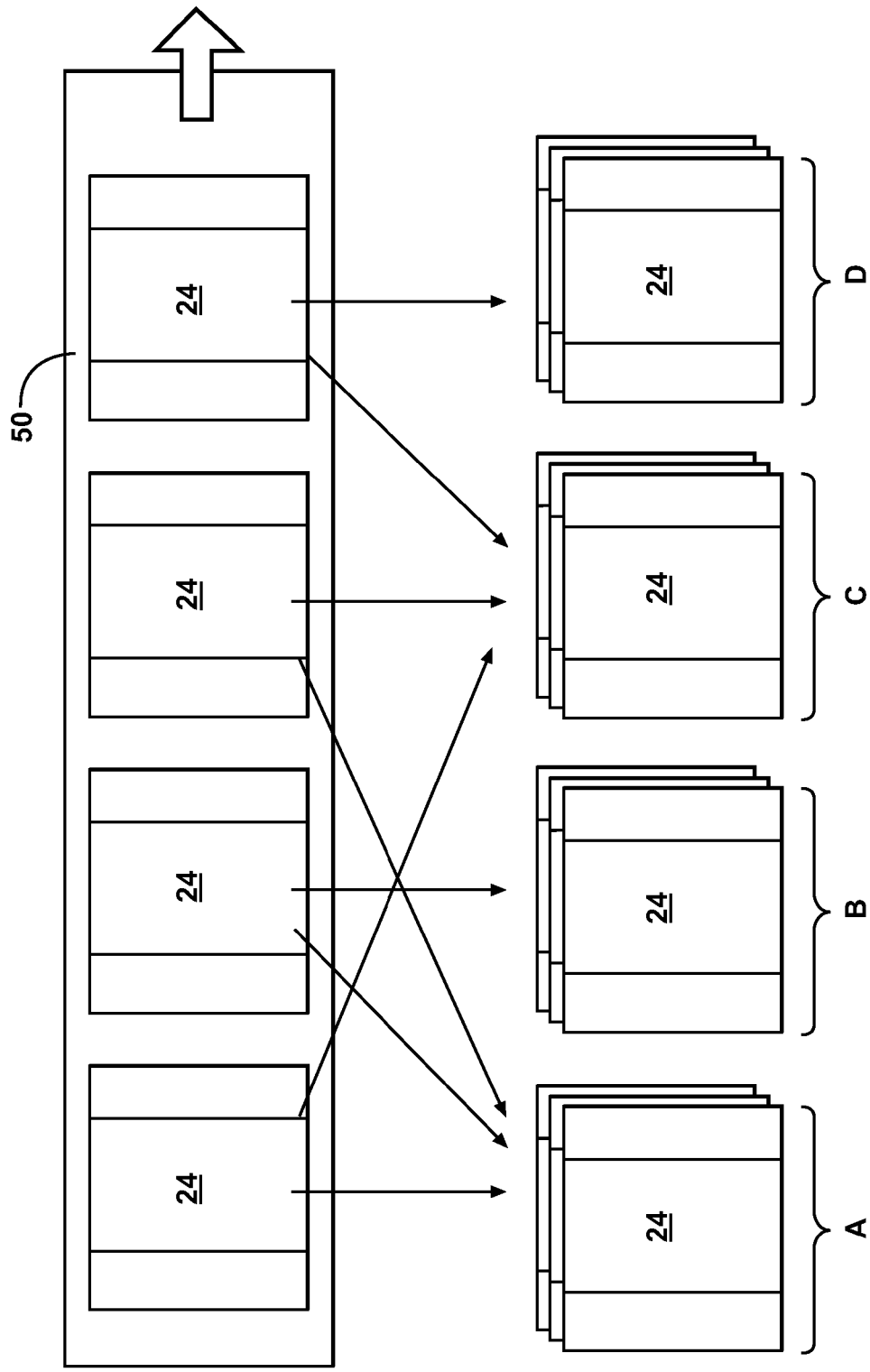
FIGS. 6 through 8 illustrates an automated system wherein damaged lithium cells removed from the battery pack are placed onto a conveyance device and separated into stacks of the cells having various operational capacity including the cells subject to complete recycle.
Figure 7:
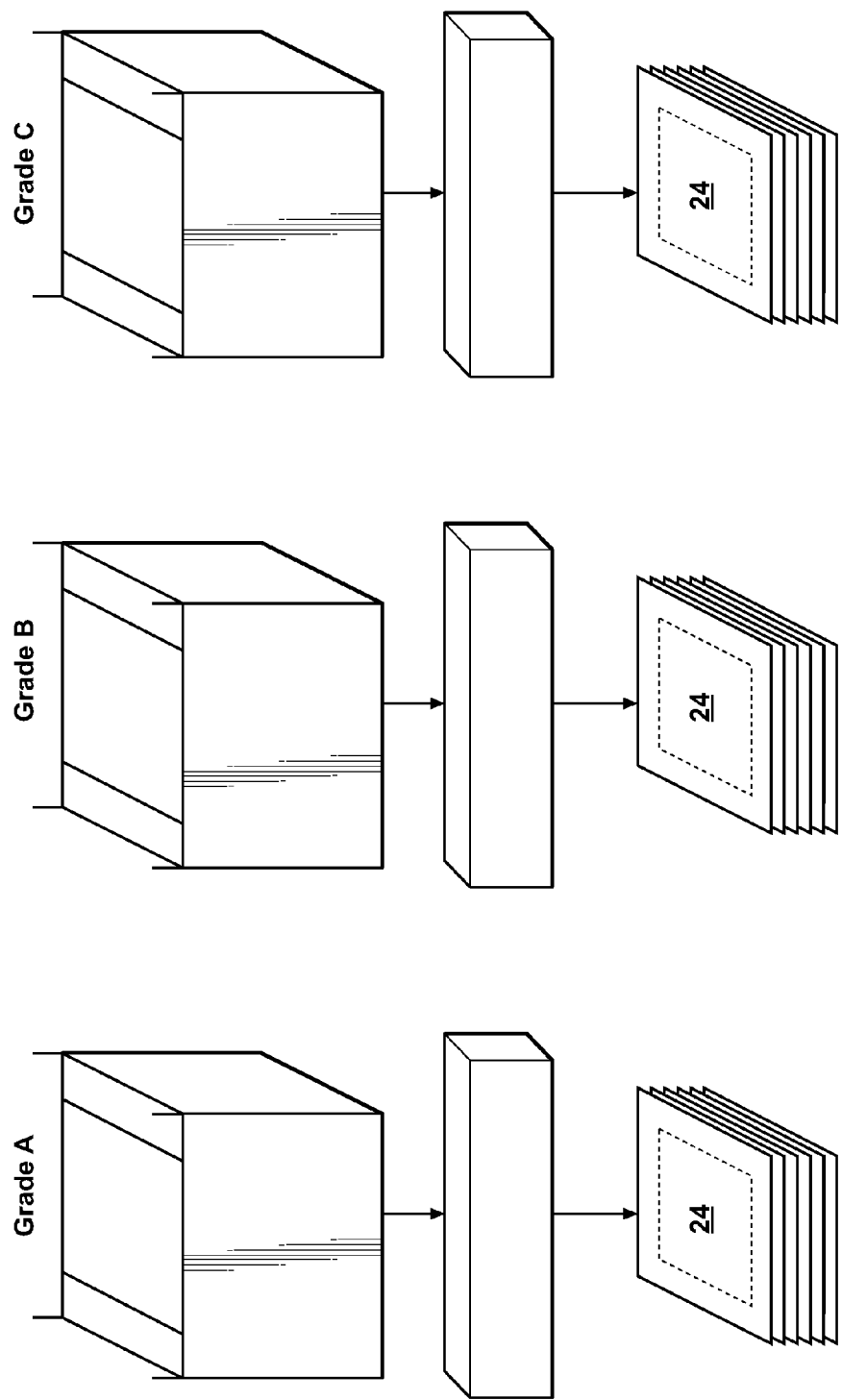
Figure 8:
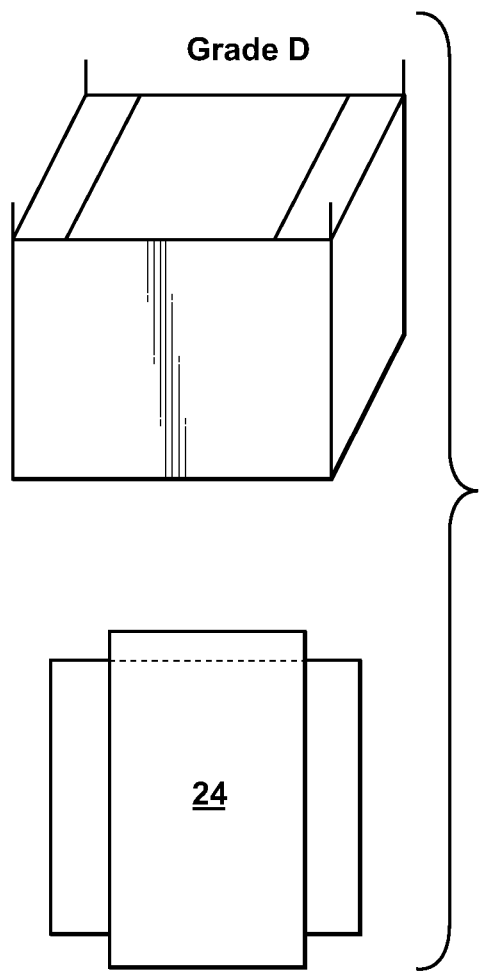
Figure 9:
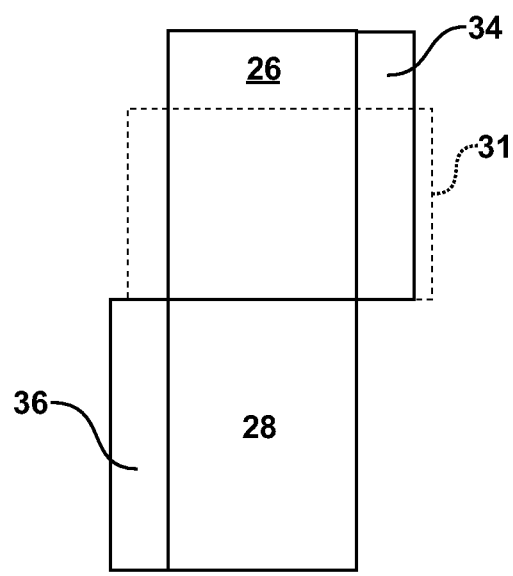
FIG. 9 illustrates the lithium cell subject to recycle before the recycling of the lithium cell begins.

As best illustrated in FIGS. 2 and 3, each cell 24 includes a first electrode, i.e. cathodes 26 and a second electrode, i.e. anodes 28. A separator layer 30 is positioned between the first 26 and second 28 electrodes with the first 26 and second 28 electrodes conducting an electrolyte 32 surrounding the same. Each cell 24 presents at least one positive terminal lip 34 and at least one negative terminal lip 36. A shell or packaging envelope 40 having a generally rectangular configuration surrounds the first and second electrodes 26 and 28 with the lips 34 and 36 extending beyond the envelope 40. The envelope 40 is sealed 42 and the edges to form an air tight environment therein to evenly space the electrolyte 32 inside the envelope 40 and to prevent leakage of the electrolyte 32. The shell 30 is formed from a sheet of packaging material, such as aluminum. A separator 31 is sandwiched between the first 26 and second 28 electrodes. Those skilled in the lithium battery art will appreciate that the shell 30 may also be fabricated from any other suitable materials without limiting functional characteristics of the present invention.

The cathode 26 or the cathode layer is a positive electrode layer, and contains at least a cathode active material. The cathode layer 26 contains a conductive material for enhancing electron conductivity of the cathode layer 26 and a binder for binding the cathode active material or the conductive material. Preferably, the cathode layer 26 contains a lithium salt for enhancing ion conductivity. It is preferred that an electrolyte be easily penetrated into the cathode layer 26 so that ions can move. As the cathode active material, a lithium-transition metal composite oxide, which is a composite oxide of lithium and transition metal, is preferably used. The cathode active material include and are not limited to Li—Co-based composite oxides such as $LiCoO_2$r Li—Ni-based composite oxides such as $LiNiO_2$, Li—Mn-based composite oxides such as spinel $LiMn_2O_4$, Li Fe-based composite oxides such as $LiFeO_2$, and those obtained by partially substituting another element for the transition metal. These lithium-transition metal composite oxides are excellent in reactivity and cycle durability. As other cathode active materials may also include and not limited to phosphoric acid compounds containing transition metal and lithium, such as $LiFePO_4$, sulfuric acid compounds containing transition metal and lithium, transition metal oxides such as $V_2O_5$, $MnO_2$, and $MoO_3$, transition metal sulfides such as $TiS_2$ and $MoS_2$, $PbO_2$, AgO, and NiOOH. In a conventional manner, an electrode is formed by applying a mixture of a fine electrode active material and a binder onto a current collector. In this case, the adhesive strength between the electrode and the current collector is low, and therefore the electrode is likely to be separated from the current collector and particles of the electrode active material are likely to be fallen off the electrode. However, by using the flat-shaped body, it is possible to prevent an electrode from being separated from a current collector, and to prevent particles of an electrode active material and a conductive material from being fallen off. The flat-shaped body has a structure which makes it possible to distribute an electrode active material therein, thereby enabling an electrode layer to be formed. The flat-shaped body has a thickness, and is a fibrous or porous body in which at least an electrode active material exists. It is preferred that at least an electrode active material can enter the inside of the flat-shaped body. A fibrous flat-shaped body contains a material composed of a fiber assembly such as non-woven fabrics, woven fabrics, knitted fabrics, or paper. A porous flat-shaped body contains a material composed of a porous structure having a plurality of interconnected pores obtained by, for example, foaming. In the fibrous or porous flat-shaped body, an electrode active material, a conductive material, a binder, and an electrolyte are usually distributed in the internal spaces.

The flat-shaped body is preferably nonconductive. The flat-shaped body preferably has a property of nonmetal which does not have conductivity. It is preferred that the flat-shaped body can be impregnated with an electrolyte, thereby evenly distributing the electrolyte over the entire electrode layer. The flat-shaped body can attract a large amount of an electrolyte, so that the electrolyte is evenly distributed around each of the plurality of electrode active material particles contained in the flat-shaped body. The flat-shaped body may be provided so as to come into direct contact with the current collector or may be provided apart from and over the current collector. In either case, the flat-shaped body is provided on the current collector so as to be opposite to the surface of the current collector. In a case where the flat-shaped body is in direct contact with the current collector, the current collector and the flat-shaped body are bonded through the surfaces thereof, and therefore, they are firmly bonded to each other. In a case where the flat-shaped body is provided apart from and over the current collector, the flat-shaped body is preferably provided so that the surface of the flat-shaped body becomes substantially parallel to the surface of the current collector. By forming an electrode layer within the flat-shaped body, it is possible to obtain the following various effects: a thick electrode layer is obtained even when a very fine powder of an electrode active material is used; deformation of an electrode is prevented; physical strength of an electrode is increased; an active material powder and a conductive material powder are prevented from being fallen off an electrode; an electrode is not collapsed more than a certain degree by virtue of the flat-shaped body when pressed; interstices between particles of an active material are maintained; adhesive strength between particles is enhanced, thereby decreasing the amount of a binder to be used; strength of the entire surface of an electrode is enhanced as in the case of a steel-reinforced building; an electrode layer is integrally formed, and therefore, the electrode layer and a current collector are firmly bonded to each other, thereby eliminating the process for providing a separator; an electrode can be evenly pressed because pressure is applied onto the flat-shaped body, thereby allowing the electrode to have a smooth surface; and when an electrode is cut, a cut surface of the electrode is not easily collapsed and a burr is not easily produced in a current collector, thereby preventing internal shorts. The flat-shaped body shall be substantially flat to the extent that the effects of the present invention can be obtained. Examples of a conductive material include, but are not limited to, acetylene black, carbon black, and graphite. Examples of a binder include, but are not limited to, polyvinylidene fluoride (PVDF), SBR, and polyimide. Examples of a lithium salt include, but are not limited to, LiBETI (lithium bis (perfluoroethylenesulfonylimide); also referred to as Li $(C_2F_5SO_2)_2N)$, $LiBF_4$, $LiPF_6$, LiN $(SO_2CF_3)_2$, LiN $(SO_2C_2F_5)_2$, LiBOB (lithium bis (oxalate) borate, and mixtures of two or more of them. As described with reference to the amount of a cathode active material to be blended, the thickness of the cathode layer should be determined in view of ion conductivity according to the usage (such as importance of output or energy) of a battery.

The anode layer 28 is a negative electrode layer, and contains at least an anode active material. The anode layer 28 includes a conductive material for enhancing the electron conductivity of the anode layer 28, a binder for binding the anode active material or the conductive material, and a lithium salt for enhancing ion conductivity. It is preferred that an electrolyte be easily penetrated into the anode layer so that ions can move. The constituent materials of the anode layer except for the anode active material are substantially the same as those described with reference to the cathode layer, and therefore, the description thereof will be omitted. Examples of an anode active material include graphite such as natural graphite and artificial graphite (e.g., fibrous graphite, flake graphite, granular graphite) and various lithium alloys. Specifically, carbon, graphite, metal oxides, and lithium-metal composite oxides can be used. Among them, carbon and lithium-transition metal composite oxides are preferably used—because they are excellent in reactivity and cycle durability, and are low cost materials. Therefore, by using such a material for an electrode, it is possible to form a battery having excellent output characteristics. Examples of a lithium-transition metal composite oxide include lithium-titanium composite oxides such as $Li_4Ti_5O_{12}$. Examples of carbon include graphite, hard carbon, and soft carbon. As the anode layer, metallic lithium per se can be used. When a secondary battery is formed, a metallic lithium foil may be used together with a cathode obtained according to the present invention by forming an electrode layer within the flat-shaped body. Particularly, it is preferred that the flat-shaped body having a non-conductive surface, which constitutes a cathode, be brought into contact with a lithium foil so that they are opposite to each other. By doing so, it is possible to prevent failures or accidents caused by a dendritic short-circuit (that is, by an internal short-circuit caused by the dendrite of metallic lithium deposited as a result of discharging and recharging) which has been a problem in secondary batteries using metallic lithium. The thickness of the anode layer is not particularly limited. As is the case with the cathode layer, the thickness of the anode layer is determined in view of the usage (e.g., importance of output or energy) of a battery and ion conductivity.

The electrolyte 32 may be used in a liquid form or a solid form. An electrolytic solution obtained by dissolving a lithium salt (which has been described with reference to the cathode layer) in an organic solvent such as an aprotic solvent can be used. Examples of such an organic solvent include: 1) cyclic carbonates such as propylene carbonate (PC) and ethylene carbonate (EC); 2) linear carbonates such as dimethyl carbonate, methyl ethyl carbonate, and diethyl carbonate; 3) ethers such as tetrahydrofuran, 2-methyl tetrahydrofuran, 1,4-dioxane, 1,2-dimethoxyethane, and 1,2-dibutoxyethane; 4) lactones such as i-butyrolactone; 5) nitrites such as acetonitrile; 6) esters such as methyl propionate; 7) amides such as dimethylformamide; and 8) methyl acetate and methyl formate. These organic solvents can be used singly or in combination of two or more of them. In a case where an electrolyte layer composed of a polymer electrolyte is provided between a cathode and an anode, the electrode layers desirably contain the polymer electrolyte. By filling the interstices between active material particles contained in the electrode layers with a polymer electrolyte, ion conduction smoothly occurs in the electrode layers, thereby increasing the output of the lithium secondary battery as a whole. As polymer electrolytes, a polymer gel electrolyte in which a polymer retains an electrolytic solution, and an all-solid polymer electrolyte composed of only a polymer electrolyte and a supporting salt such as a lithium salt can be mentioned. Examples of such an all-solid polymer electrolyte include, but are not limited to, polyethylene oxide (PEO), polypropylene oxide (PPO), and a copolymer thereof. Polymers containing an oxyalkylene segment in the molecular chain or branched chain thereof are also preferably used. Preferred examples of a polymer include branched polyethylene oxide, branched polypropylene oxide, hydroxypropylpolysaccharide derivatives, hydroxyethylpolysaccharide derivatives, dihydroxyethylpolysaccharide derivatives, polyurethane-based polymers containing an oxyalkylene segment, polymethylmethacrylate and acrylate-based polymers containing an oxyalkylene segment, and silicon-based polymers containing an oxyalkylene segment. A lithium salt such as $LiBF_4$, $LiPF_6$, $LiN(SO_2CF_3)_2$, or $LiN(SO_2C_2F_5)_2$ is highly soluble in the above-mentioned polymers. A polymer in which such a lithium salt is dissolved in a solid state so as to have a lithium salt concentration of about 0.5 to 1.5 M and an ion conductivity of $10^{-5}$ Scm$^{-1}$ or more is preferably used. In the present invention, an all-solid polymer electrolyte is preferably contained in both of the cathode and anode layers to improve the electrode characteristics thereof. On the other hand, a polymer gel electrolyte is obtained by allowing a polymer to contain an electrolytic solution therein. Preferred examples of such a polymer include, but are not limited to, the above-mentioned all-solid polymer electrolytes. A polymer gel electrolyte may also be obtained by allowing a polymer (a host polymer), which does not have lithium ion conductivity, to retain an electrolytic solution in the frame thereof. An electrolytic solution (which is composed of an electrolytic salt and a plasticizer) contained in a polymer gel electrolyte is not particularly limited as long as it can be usually used in lithium ion batteries. Examples of a lithium salt (that is, an electrolytic salt) include, but are not limited to, anion salts of inorganic acid such as LiBOB (lithium bis (oxalate) borate), $LiPF_6$, $LiBF_4$, $LiClO_4$, $LiAsF_6$, $LiTaF_6$, $LiAlCl_4$, and $Li_2B_{10}Cl_{10}$, and anion salts of organic acid such as $LiCF_3SO_3$, $Li(CF_3SO_2)2N$, and $Li(C2F5SO,2)2N$ (LiBETI). These lithium salts can be used singly or in combination of two or more of them. Examples of an organic solvent such as an aprotic solvent (that is, a plasticizer) include, but are not limited to, cyclic carbonates such as propylene carbonate (PC) and ethylene carbonate (EC), linear carbonates such as dimethyl carbonate, methyl ethyl carbonate, and diethyl carbonate, ethers such as tetrahydrofuran, 2-methyl tetrahydrofuran, 1,4-dioxane, 1,2-dimethoxyethane, and 1,2-dibutoxyethane, lactones such as γ-butyrolactone, nitriles such as acetonitrile, esters such as methyl propionate, amides such as dimethylformamide, and methyl acetate and methyl formate. These organic solvents can be used singly or in combination of two or more of them. Examples of a polymer which does not have lithium ion conductivity and is used for a polymer gel electrolyte include, but are not limited to, polyvinylidenefluoride (PVDF), polyvinyl chloride (PVC), polyacrylonitrile (PAN), and polymethylmethacrylate (PMMA). It is to be noted that since PAN and PMMA tend to be among polymers which hardly have ion conductivity, PAN and PMMA can be categorized as the above-mentioned polymer having ion conductivity. However, in the present invention, PAN and PMMA are mentioned as examples of a polymer which does not have lithium ion conductivity and is used for a polymer gel electrolyte. The ratio (weight ratio) of a host polymer to an electrolytic solution constituting a polymer gel electrolyte is determined according to the usage of a battery, but is in the range of 2:98 to 90:10. An electrolyte exuded from the periphery of the electrode layer can be effectively sealed by providing an insulating layer or an insulating portion. Therefore, it is possible to give a relatively high priority to battery characteristics when the ratio (weight ratio) of a host polymer to an electrolytic solution constituting a polymer gel electrolyte is determined.

Alluding to the above, as the technician completes testing the cells 24 by measuring the internal resistance of the cells 24, the cells 24 with the internal resistance less than the predetermined level are removed from the housing 12 and placed onto an automation system such as, for example, a conveyance device 50. Based upon a deviation of the internal resistance of the cells 24 from the predetermined level of operational capability, the cells 24 are classifies by different grades, such as grades A through D and are stacked accordingly. The cells 24 that are classified as "graded" are then undergo the recycling process and are replaced by a new cell or cells 24 as the battery pack 10 is re-assembled. The recycling process of the grades A through C presents usage of these cells 24 in various other non-automotive applications. Based upon a deviation of the internal resistance of the cells 24 from the predetermined level of operational capability, the cells 24 are used for various household appliances and goods, computers, motorcycles, and any other applications that require a battery. The cells 24 classified as "grade D" are placed in a dryer box or dry room to undergo a complete recycle. The envelope of the cell 24 is cut to remove the separator therefrom to discard the separator.

Figure 10:
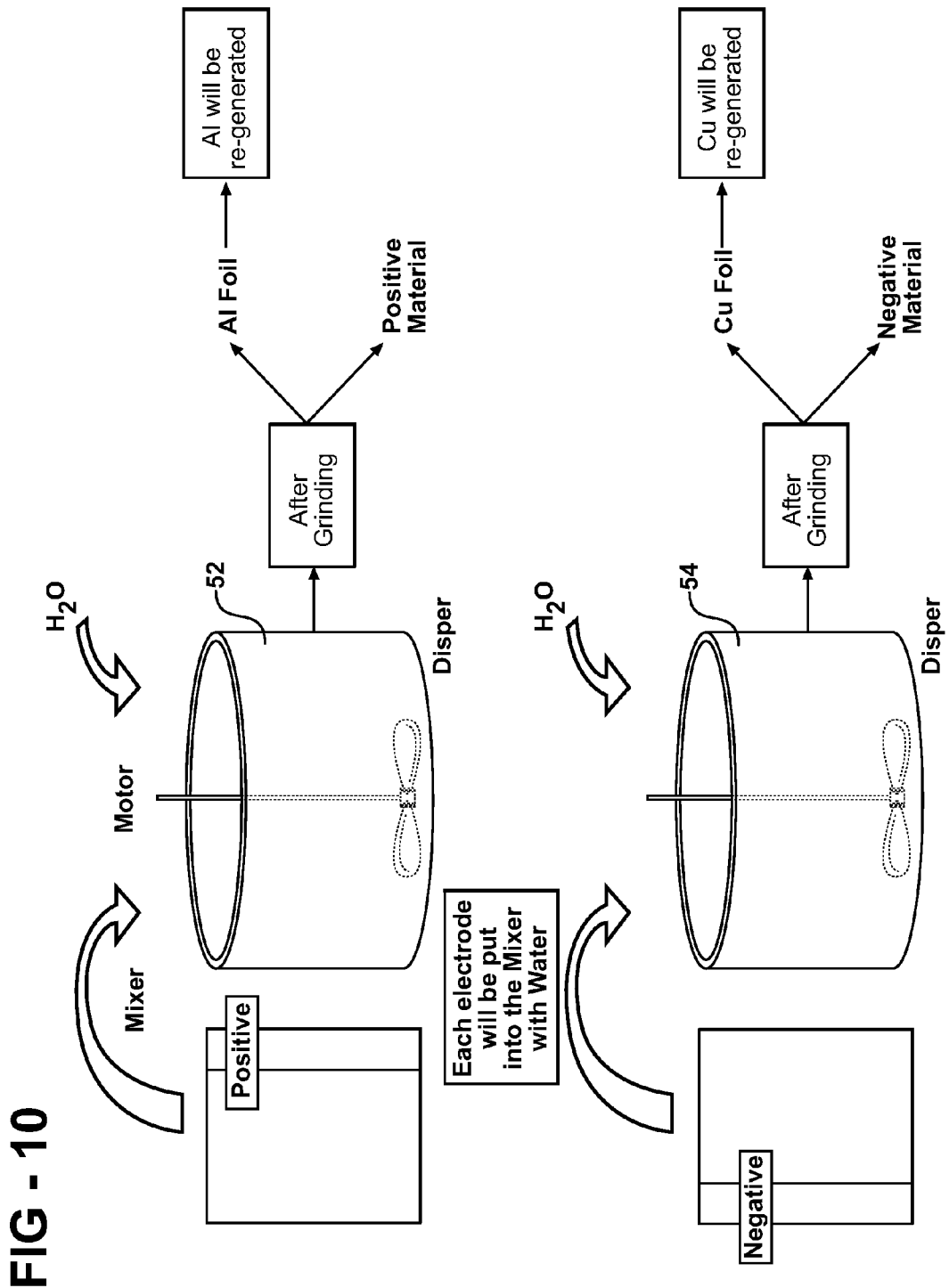
FIGS. 10 and 11 illustrate the recycling process of the inventive method.
Figure 11:
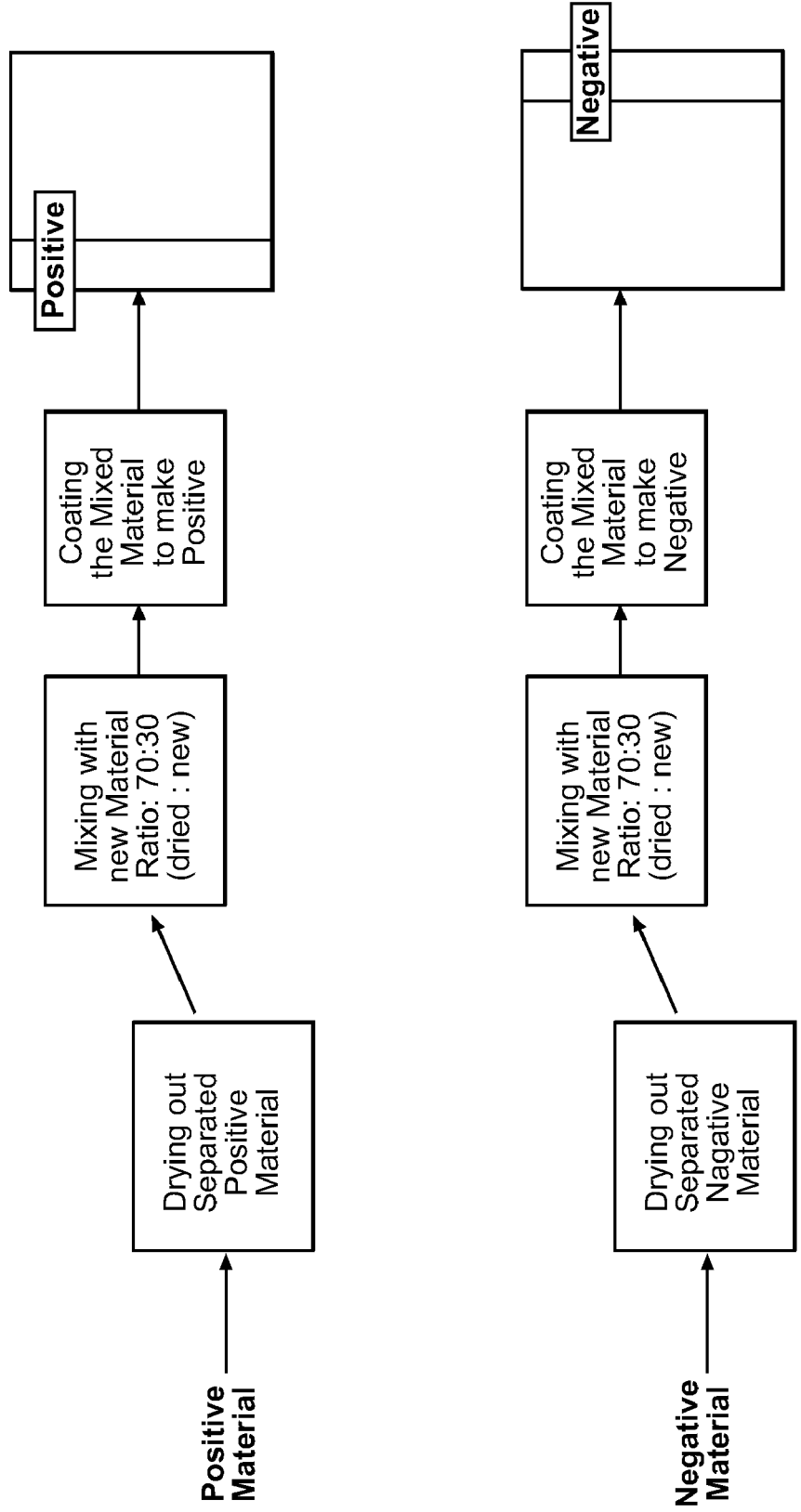

As best shown in FIGS. 10 and 11, each electrode 26 and 28 of the cell 24 is placed into a first mixer 52 and a second mixer 54 with water and then ground. The first and second electrodes 26 and 28 are recycled separately from one another by separately placing the first electrode having the aluminum and the positive material into the first mixer 52 and separating the aluminum from the positive material as the first electrode 26 is mixed with fluid and placing the second electrode 28 having the copper and the negative material into the second mixer 54 and separating the copper from the negative material as the second electrode is mixed with fluid. The positive material separated from the aluminum and the negative material separated from the copper are dried and then mixed the new positive material with the dried positive material and the new negative material with the dried negative material to form a new negative mixture based on a ration predetermined upon the difference between the predetermined level of operational capability of the cell and the operational level of the cell removed from the battery. Preferably, the ratio is up to 70 percent of at least one of the dried positive and negative materials and up to 30 percent of at least one of the new positive and negative materials. Furthermore, this ration may present at least 70 percent of at least one of the dried positive and negative materials and at least 30 percent of at least one of the new positive and negative materials.

The new negative and positive mixtures are coated, respectively, on the regenerated copper to form a new second electrode and the new positive mixture is coated on the regenerated aluminum to form a new first electrode. The new first and second electrodes are later combined with a new separator and an electrolyte placed therebetween to form the new cell. The present invention present numerous advantages over the prior art designs, one of which illustrated in FIG. 4. As shown, the "rolled" or "round" design prevent equal and even degradation of the cell capacity due to the design. The cells of this type are not suitable and efficient for recycling and secondary applications since the electrode quality varies throughout the electrode structure after use, an issue which the present inventive concept cures. The present invention provides an improved system for recycling battery cell, which is cost effective and environmentally safe and efficient.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of recycling a battery usable in an automotive application and having a plurality of lithium cells removable from one another with each lithium cell having a first electrode formed from a first metal having a positive material and a second electrode formed from a second metal having a negative material with the second electrode having a charge opposite from the first electrode, said method comprising the steps of:

disassembling the battery to remove the lithium cells;
    measuring an internal resistance of each of the removed lithium cells in view of a predetermined level of operational capability, whereby the internal resistance is indicative of at least one of a charge capacity and a discharge capacity, so that each of the removed lithium cells is either below the predetermined level or meets the predetermined level;
    separating the removed lithium cells into at least two recycling categories, wherein at least one recycling category includes the removed lithium cells below the predetermined level and wherein at least another recycling category includes the removed lithium cells that meet the predetermined level;
    replacing the lithium cells being removed from the battery with new lithium cells comprising materials from the removed lithium cells below the predetermined level and re-assembling the battery;
    recycling the lithium cells of one of the recycling categories removed from the battery by separating at least one of the first metal from the positive material and the second metal from the negative material by grinding the same with a fluid in a mixer as at least one of the first metal and the second metal is regenerated and forming a new cell by mixing the recycled positive material with new positive material and the recycled negative material with new negative material in predetermined ratios; and
    re-using the lithium cells of another of the recycling categories in an application differing from their original application, wherein the lithium cells of another of the recycling categories are unusable in their original application.

2. A method as set forth in claim 1 wherein the step of recycling the lithium cells removed from the battery is further defined by separating the first electrode from the second electrode and recycling the first and second electrodes separately from one another.

3. A method as set forth in claim 2 wherein the step of recycling the lithium cells removed from the battery is further defined by placing the first electrode having the first metal and the positive material into a mixer and separating the first metal from the positive material as the first electrode is mixed with fluid.

4. A method as set forth in claim 1 wherein the first metal is aluminum.

5. A method a set forth in claim 4 including the step of regenerating the aluminum removed from the positive material.

6. A method as set forth in claim 5 including the step of drying the positive material separated from the aluminum.

7. A method as set forth in claim 6 including the step of mixing the new positive material with the dried positive material to form a new positive mixture based on a ratio predetermined upon the difference between the predetermined level of operational capability of the lithium cell and the operational level of the lithium cell removed from the battery.

8. A method as set forth in claim 7 wherein the predetermined ratio presents up to 70 percent of the dried positive material and up to 30 percent of the new positive material.

9. A method as set forth in claim 7 wherein the predetermined ratio presents at least 70 percent of the dried positive material and at least 30 percent of the new positive material.

10. A method as set forth in claim 1 wherein the second metal is copper.

11. A method a set forth in claim 10 including the step of regenerating the copper removed from the negative material.

12. A method as set forth in claim 11 including the step of drying the negative material separated from the copper.

13. A method as set forth in claim 12 including the step of mixing the new negative material with the dried negative material to form a new negative mixture based on a ratio predetermined upon the difference between the predetermined level of operational capability of the lithium cell and the operational level of the lithium cell removed from the battery.

14. A method as set forth in claim 13 wherein the predetermined ratio presents up to 70 percent of the dried negative material and up to 30 percent of the new negative material.

15. A method as set forth in claim 14 wherein the predetermined ratio presents at least 70 percent of the dried negative material and at least 30 percent of the new negative material.

16. A method as set forth in claim 12 including the step of coating the new negative mixture on the regenerated copper to form a new second electrode and coating the new positive mixture on the regenerated aluminum to form a new first electrode.

17. A method as set forth in claim 16 including the step of combining the new first electrode and the new second electrode with a separator and an electrolyte placed therebetween to form the new lithium cell.

18. A method of recycling a lithium cell comprising the steps of:
- forming a battery device having a plurality of the lithium cells removable from one another with each lithium cell having a first electrode formed from an aluminum having a positive material and a second electrode formed from a copper having a negative material with the second electrode having a charge opposite from the first electrode,
- disassembling the battery device to remove the lithium cells,
- measuring internal resistance of the lithium cells to determine at least one of a charge capacity and a discharge capacity thereby determining if the lithium cells present a predetermined level of operational capability,
- removing the lithium cells having the operational level less than the predetermined level of operational capability thereby separating the removed cells into at least two recycling categories based on deviation of the operational level of the removed lithium cells from the predetermined level of operational capability,
- replacing the lithium cells being removed from the battery with new cells and assembling the battery,
- recycling the cells of one of the recycling categories removed from the battery by separating at least one of the aluminum from the positive material and the copper metal from the negative material by grinding the same with a fluid in a mixer as at least one of the aluminum and the copper is regenerated,
- separating the first electrode from the second electrode and recycling the first and second electrodes separately from one another by separately placing the first electrode having the aluminum and the positive material into a first mixer and separating the aluminum from the positive material as the first electrode is mixed with fluid and placing the second electrode having the copper and the negative material into a second mixer and separating the copper from the negative material as the second electrode is mixed with fluid,
- drying the positive material separated from the aluminum and the negative material separated from the copper,
- mixing the new positive material with the dried positive material to form a new positive mixture based on a ratio predetermined upon the difference between the predetermined level of operational capability of the cell and the operational level of the cell removed from the battery wherein the predetermined ratio presents up to 70 percent of the dried positive material and up to 30 percent of the new positive material,
- mixing the new negative material with the dried negative material to form a new negative mixture based on a ratio predetermined upon the difference between the predetermined level of operational capability of the lithium cell and the operational level of the lithium cell removed from the battery wherein the predetermined ratio presents up to 70 percent of the dried negative material and up to 30 percent of the new negative material,
- coating the new negative mixture on the regenerated copper to form a new second electrode and coating the new positive mixture on the regenerated aluminum to form a new first electrode,
- combining the new first electrode and the new second electrode with a separator and an electrolyte placed therebetween to form the new cell, and
- re-using the lithium cells of another of the recycling categories in a second application other than the automotive application, wherein the lithium cells of another of the recycling categories are unusable in the automotive application.

19. The method as set forth in claim 18, wherein the combining step further comprises positioning the new first electrode, the new second electrode, the separator, and the electrolyte into a housing having a bottom, side walls, a lid removably attached to said side walls, and a plurality of pins extending from said bottom and through said lid, to form at least one new lithium cell.

20. The method as set forth in claim 19, wherein the combining step is performed to form a plurality of lithium cells.

21. The method as set forth in claim 20, wherein the combining step further comprises positioning at least one resilient member between each of said plurality of lithium cells for forcing said lithium cells against said lid and said bottom thereby evenly pressing said lithium cells relative to one another.

22. A method for recycling a battery comprising a plurality of lithium cells, the method comprising the steps of:
- removing lithium cells from a battery;
- measuring an internal resistance of each of the removed lithium cells in view of a predetermined threshold of operational capability, so that each of the removed lithium cells is either below the predetermined threshold or meets the predetermined threshold;
- if at least one removed lithium cell is below the predetermined threshold, recycling at least one said cell(s) by:
  - separating a first original metal of an original positive material of said cell(s) from a second original metal of an original negative material of said cell(s) by grinding the same with a fluid in a mixer,
  - adding new positive material to the original positive material to form a positive material mixture,
  - adding new negative material to the original negative material to form a negative material mixture,
  - forming new positive electrodes from the positive material mixture and new negative electrodes from the negative material mixture, and
  - forming new lithium cells from the new positive electrodes, the new negative electrodes, a separator, and an electrolyte;
- if at least one removed lithium cell meets the predetermined threshold, re-use said cell(s) in an application different from an original application the battery was used; and
- replacing the removed lithium cells with the new lithium cells to reassemble the battery.

* * * * *